INVENTOR:
Ernest G. Boden,
by Cann Plan Gravely,
HIS ATTORNEYS.

Patented June 24, 1930

1,768,460

UNITED STATES PATENT OFFICE

ERNEST G. BODEN, OF CANTON, OHIO, ASSIGNOR TO THE TIMKEN ROLLER BEARING COMPANY, OF CANTON, OHIO, A CORPORATION OF OHIO

BEARING

Application filed September 20, 1929. Serial No. 394,050.

My invention relates to bearings, particularly to bearings adapted for oscillating movement or for low speed rotary movement. The invention has for its principal object a bearing having a bushing ring which is adjustable for wear and which can withstand end thrust in addition to carrying radial load. The invention consists principally in a bushing ring of conical cross-section interposed between conical inner and outer annular raceways. The invention further consists in the bearing and in the parts and combinations of parts hereinafter described and claimed.

In the accompanying drawing.

Figure 3:
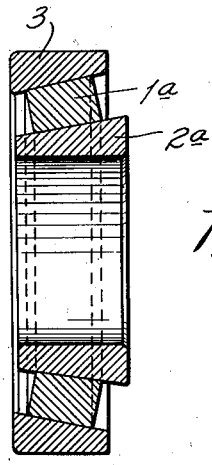
Figure 4:
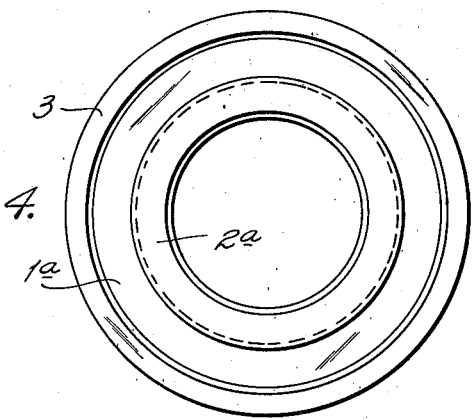
Figure 5:
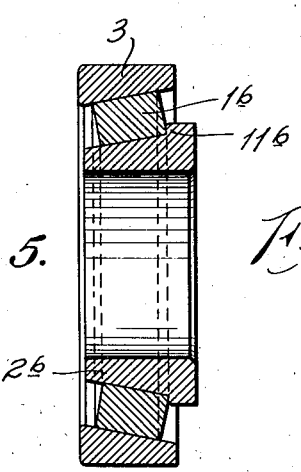
Figure 6:
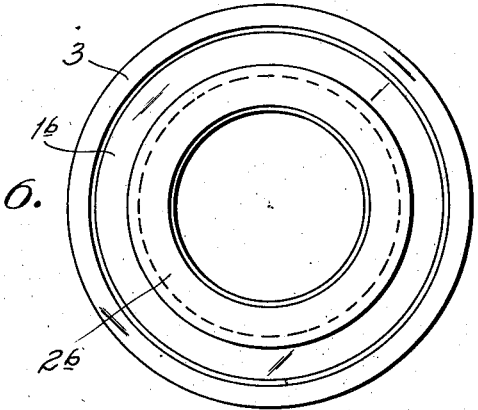

Figs. 3 and 4 are views similar to 1 and 2, respectively, showing a modified form of the invention; and Figs. 5 and 6 are similar views showing another modified form of the invention.

An annular bushing 1 of conical section is interposed between an inner race member 2 having a conical raceway portion on its outer periphery and an outer race member 3 having a conical raceway portion formed in its bore, said bushing engaging the raceways of said inner and outer race members. Suitable adjusting and retaining means will be provided for properly positioning the parts of the bearing, as an adjusting nut 4 with a locking device 5.

Figure 1:
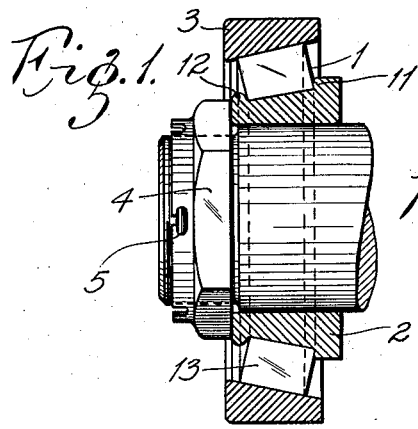
Fig. 1 is a sectional view of a bearing embodying my invention.
Figure 2:
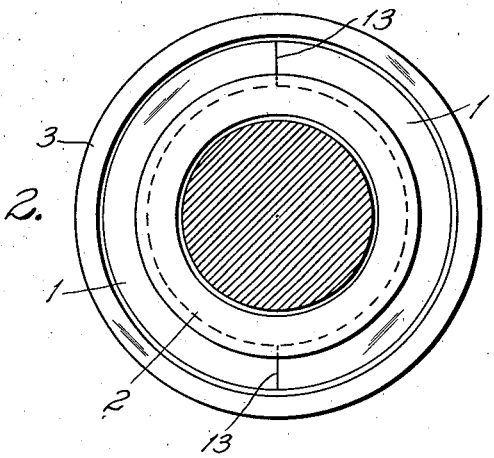
Fig. 2 is an end view thereof.

The inner bearing member 2 of Figs. 1 and 2 is provided with a thrust rib 11 at its large end and with a rib 12 at its small end; and the bushing 1 is split as indicated at the points 13 to form two parts which may be assembled on the raceway of the inner bearing member 2 between the ribs. The rib 11 at the large end of the inner bearing member is a thrust rib against which the large end face of the bushing 1 abuts.

In the construction shown in Figs. 3 and 4, the inner bearing member 2ª has a plain conical surface, having no rib at either end; so that the bushing 1ª may in this case be a one piece ring.

In the construction shown in Figs. 5 and 6, the inner bearing member 2ᵇ has a thrust rib 11ᵇ at its large end, but has no rib at the small end. In this construction also, the bushing ring 1ᵇ may be in one piece.

The hereinbefore described bearing is particularly well adapted for use in devices having an oscillating movement or a low speed rotary movement. For example, it may be used to advantage in the valve rocker arms of airplane and other motors. The bearing is able to carry radial load and also to withstand end thrust. The bushing is free to float between the two race members. The bearing is extremely quiet and shows little wear after long use. The bearing may be adjusted for wear of the parts and it is simple to make and assemble. The parts may be made of any materials suitable for the purpose, such as bronze or other bearing metal for the bushing and steel for the inner and outer race members.

What I claim is:

1. A bearing comprising inner and outer race members having conical raceways formed thereon and a ring interposed therebetween, said ring having a conical cross-section and engaging the raceways of both inner and outer bearing members.

2. A bearing comprising inner and outer race members having conical raceways formed thereon, a ring interposed therebetween, said ring having a conical cross-section and engaging the raceways of both inner and outer bearing members and means for adjusting said bearing.

3. A bearing comprising inner and outer race members having conical raceways formed thereon and a ring interposed therebetween, said ring having a conical cross-section and engaging the raceways of both inner and outer bearing members, and one of said race members having a thrust rib against which said ring abuts.

4. A bearing comprising inner and outer race members having conical raceways formed thereon and a ring interposed therebetween, said ring having a conical cross-section and engaging the raceways of both inner and outer bearing members and said inner race member having a thrust rib at its large end against which said ring abuts.

5. A bearing comprising inner and outer race members having conical raceways formed thereon and a split ring interposed therebetween, said ring having a conical cross-section and engaging the raceways of both inner and outer bearing members, said inner race member having ribs at its ends.

Signed at Canton, Ohio, this 16 day of September, 1929.

ERNEST G. BODEN.